Figures 1, 2, 3:
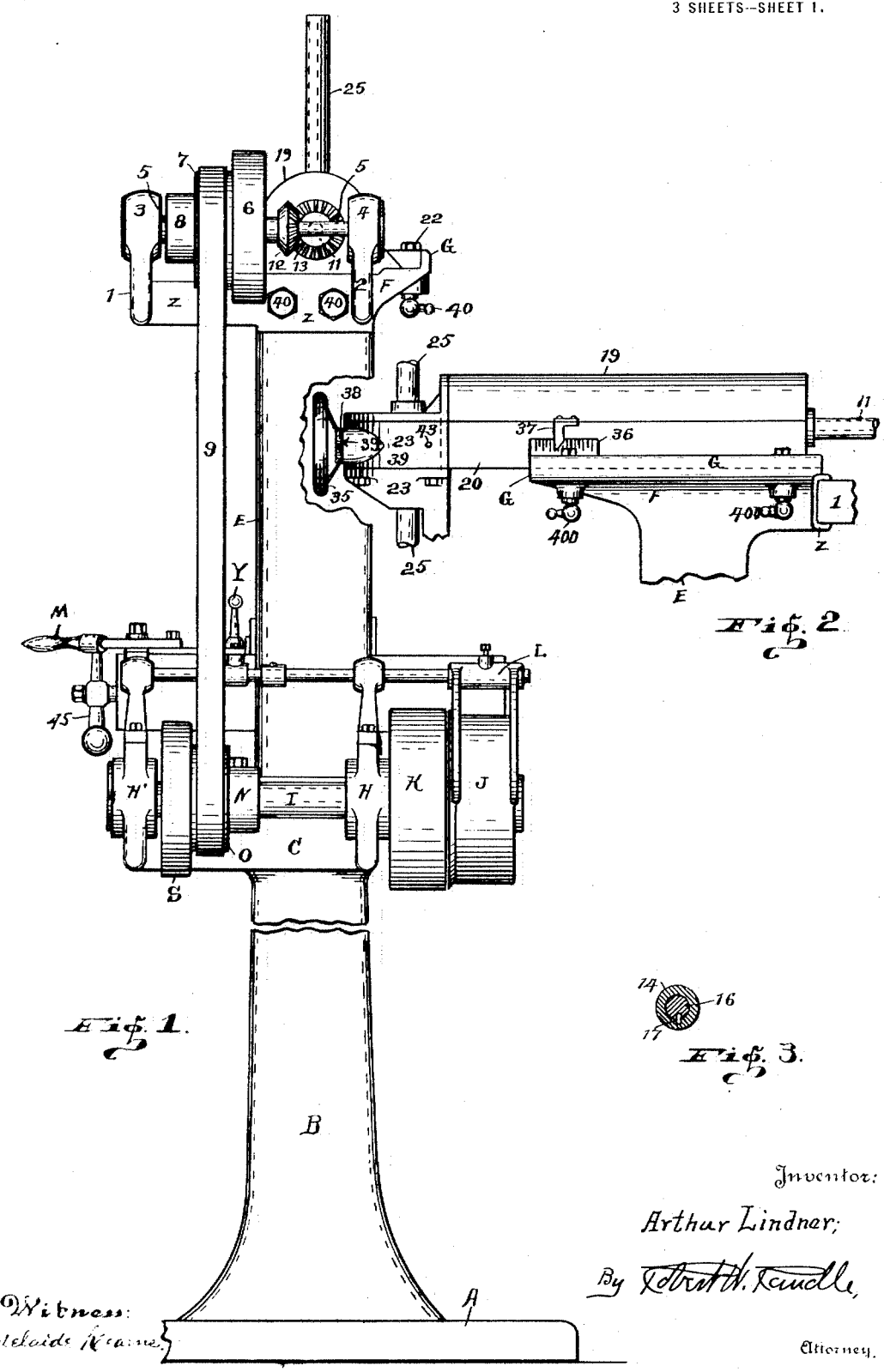

A. LINDNER.
CENTERING MECHANISM.
APPLICATION FILED APR. 22, 1918.

1,315,711.

Patented Sept. 9, 1919.
3 SHEETS—SHEET 1.

Witness:
Adelaide Kearns

Inventor:
Arthur Lindner,
By Robert W. Randle,
Attorney.

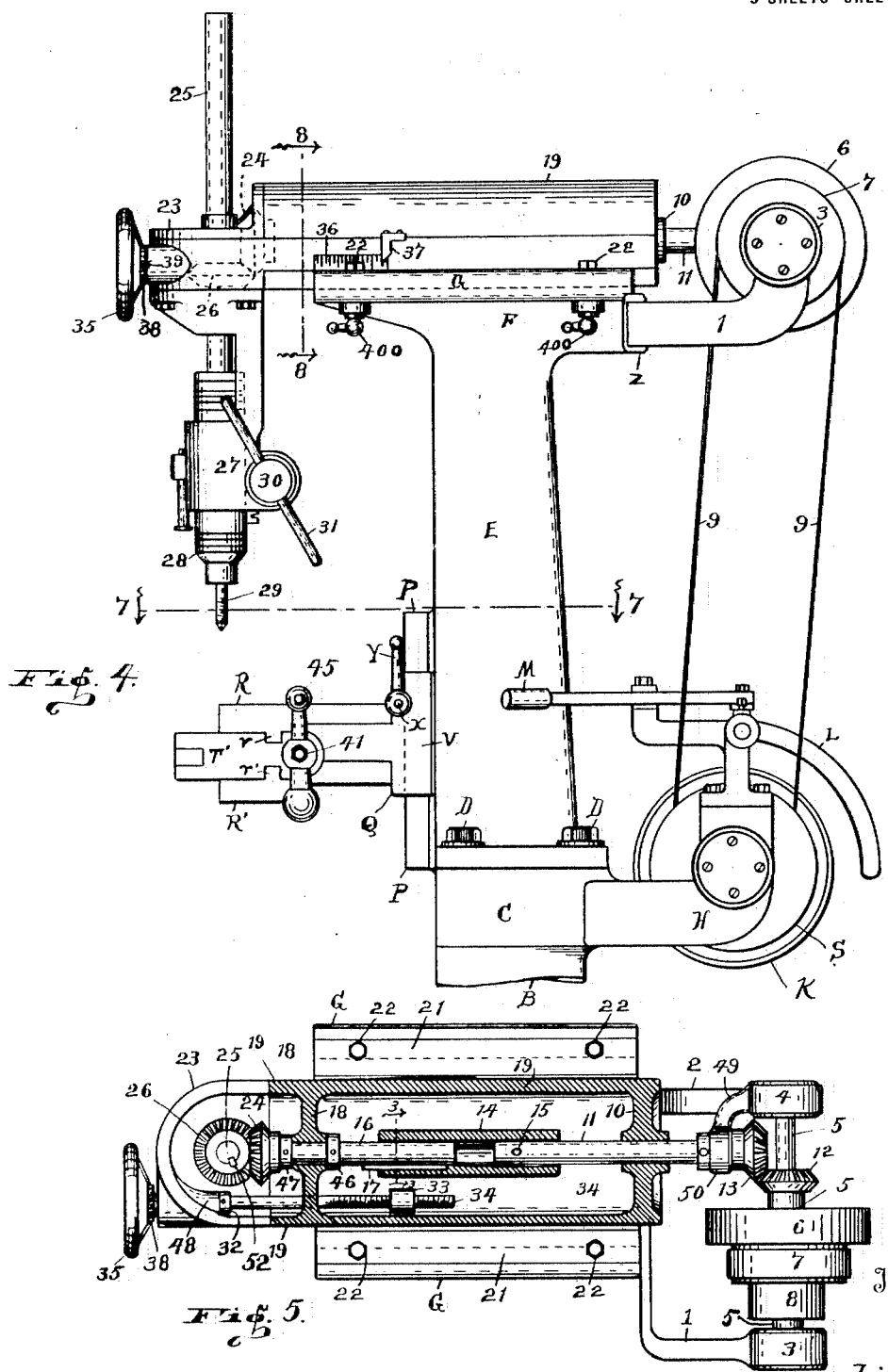

A. LINDNER.
CENTERING MECHANISM.
APPLICATION FILED APR. 22, 1918.
1,315,711.
Patented Sept. 9, 1919.
3 SHEETS—SHEET 3.
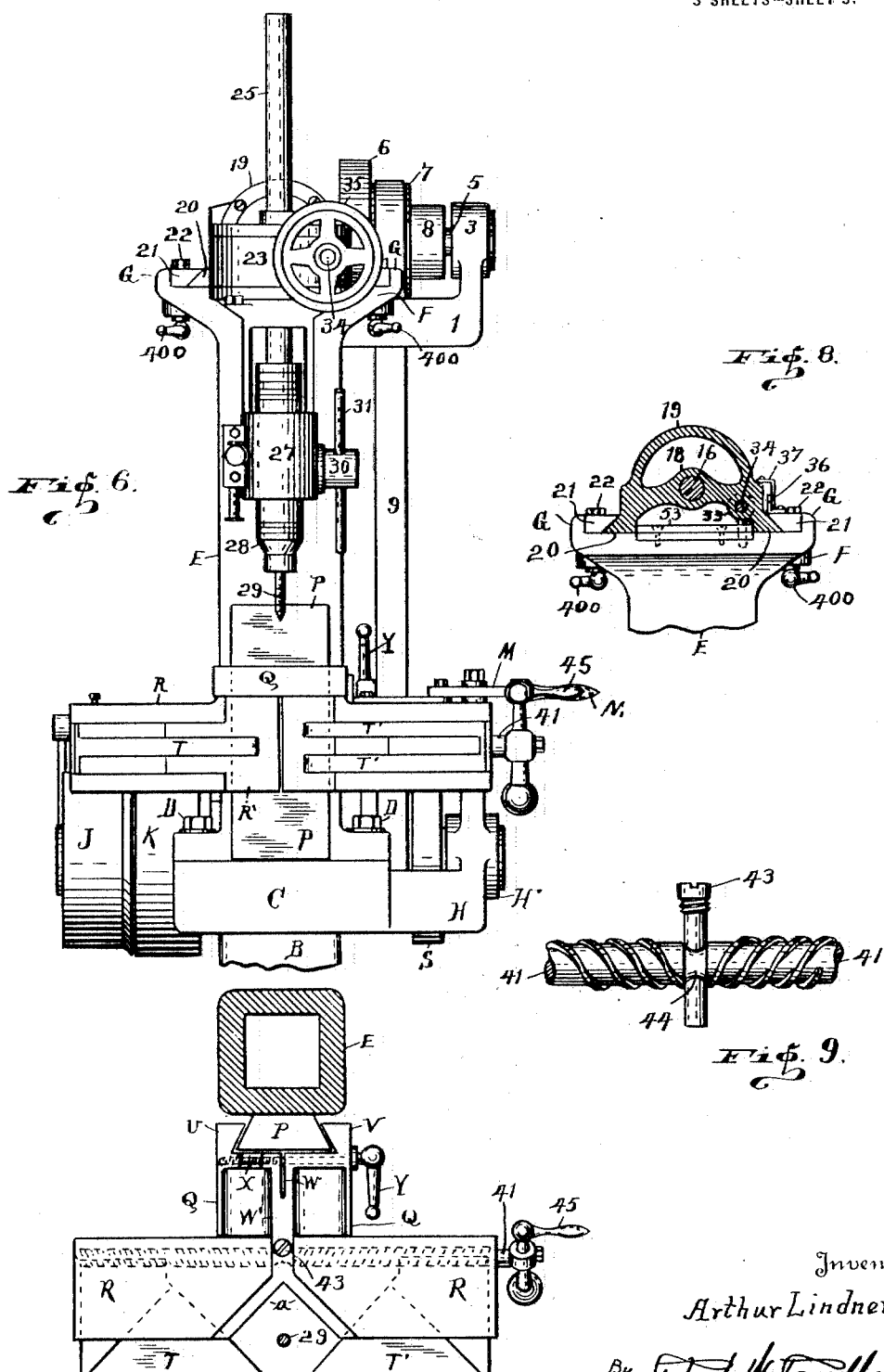
Inventor:
Arthur Lindner,
By Robert W. Randle,
Attorney.

UNITED STATES PATENT OFFICE.

ARTHUR LINDNER, OF INDIANAPOLIS, INDIANA.

CENTERING MECHANISM.

1,315,711.  Specification of Letters Patent.  Patented Sept. 9, 1919.

Application filed April 22, 1918. Serial No. 230,019.

*To all whom it may concern:*

Be it known that I, ARTHUR LINDNER, a citizen of the United States, residing in the city of Indianapolis, in the county of Marion, State of Indiana, have invented new and useful Improvements in Centering Mechanisms for Metal-Working Machines, of which the following is a full, clear, and comprehensive specification and exposition.

The object of this invention, boardly speaking, is to provide mechanisms for metal working machines or the like, which will be strong and durable in construction, simple and compact in their several elements, easily operated and controlled, and which can be manufactured, installed, and sold at a comparatively low price.

More specifically stated my object is to produce centering adjusting, gaging, and holding mechanisms for metal working machines, which are especially intended to be incorporated in shop or factory tools, such as drill-presses or the like, in which the work may be centered and held with absolute precision, and in which the tool to be employed in connection therewith may be accurately positioned by the employment of graduated scales of infinitesimal precision, in order that the resultant product may be absolutely correct and accurate when completed.

In other words, I propose to provide attachments for metal working machines wherein I provide means for centering the work to be operated upon, and means for centering or gaging a tool to operate upon the work, whereby the results will be absolutely accurate, and by which the operations may be controlled by a mechanician of only ordinary adaptability or training.

Briefly stated, my object is to provide means for centering the work, and means for centering or adjusting the tool to the work.

Other objects and particular advantages of the invention will suggest themselves in the course of the following description, and that which is new and novel will be correlated in the appended claim which terminates this specification.

In this instance I have shown the principles of my invention as incorporated with and forming a part of what may be termed a drill-press, however it is to be understood that the invention is not to be limited to that purpose as it is susceptible to various other uses and for incorporation with various kinds of machines with only slight modifications in the construction.

One manner for carrying out the principles of my invention in a practical way is shown in the accompanying three-sheets of drawings, in which—Figure 1 is a rear elevation of a complete machine embodying my invention. Fig. 2 is a front elevation of the upper or main portion of the same, showing one position of adjustment. Fig. 3 is a detail cross section, as taken on the line 3—3 of Fig. 5. Fig. 4 is a right-hand side elevation of the machine. Fig. 5 is a central longitudinal horizontal section taken through the head portion of the machine, centrally of the horizontal telescoping shaft, which is not shown in section however. Fig. 6 is a front elevation of the machine. Fig. 7 is a plan view of the adjustable table, showing the standard in section, for instance on the line 7—7 of Fig. 4. Fig. 8 is a cross section, as taken on the line 8—8 of Fig. 4. Fig. 9 is a detail view showing a portion of the twin-screw for adjusting the jaws of the work table or vise.

Similar indices denote like parts throughout the several views.

In order that the construction, the operation, and the advantages of my invention may be fully understood and appreciated I will now take up a detailed description thereof, in which I will set forth the several features as fully and as comprehensively as I may.

In the drawings letter A denotes the base, and B denotes the pedestal having a top or head C. Secured on the top C, by the bolts D, is the upwardly extending standard E, whose upper portion merges into the forwardly and rearwardly extending and laterally flaring bed-plate F, which has right and left upwardly extending marginal flanges or lips G.

Extending to the rear from the top C are the two hanger-arms H and H' in which are formed bearings for the shaft I. Located on the left-hand portion of the shaft I are the pulleys J and K.

The pulley J is idle on said shaft, while the pulley K is secured thereto. It is, of course, to be understood that a power belt (not shown) is to be placed on said pulleys and adapted to be shifted from one to the other as required, this being accomplished by means of the belt shifter L, the latter being operative by the lever M. Also secured on the shaft I are the power pulleys N, O and S.

Rigidly connected with the forward vertical face of the lower portion of the standard E is the dove-tail rib P, to which is slidably mounted the table-block Q whose inner portion forms the jaws U and V with their inner edges fitting the sides of the rib P.

Centrally of the jaws U and V there is formed, in the center of the central rib W', a slot W by reason of which the said jaws may be sprung slightly toward each other, as hereinafter set forth.

Extending horizontally through the block Q, immediately forward of said jaws, is an aperture for the shaft X, which passes through the slot W. One-half of said aperture is threaded for the threaded portion of the shaft X, while the other portion is smooth and in which said shaft may freely revolve. Letter Y designates the handle secured to one end of the shaft X and by which said shaft may be revolved manually. It is evident that by turning the handle Y to the right the jaws may be clamped to the rib P.

The block Q is formed integral with the relatively stationary part of the table, the same comprising upper and lower members R and R', respectively, which are spaced apart as shown.

A right-angular notch $a$ is formed in the center of the forward edges of the members R and R', the same converges rearward.

Right angular faced jaws T and T' are slidably mounted between the members R and R', with their angular faces adapted to approach and recede with relation to each other.

The shaft 41 is divided into two portions by the channel 44 formed around in the center thereof, the portion on the left being threaded opposite to that on the right, thereby providing right-hand and left-hand threads as shown in Fig. 9. The rear edges of the jaws T and T' are correspondingly threaded to mesh with respective right and left threads of the shaft 41, whereby the turning of the shaft 41 will cause said jaws to approach or recede with relation to each other. The shaft 41 is prevented from longitudinal movements by means of the screw pin 43 which is threaded through the member R, passing through a segment of the channel 44, with its lower end inserted through the member R'.

The said jaws are retained in engagement with the screw shaft 41 by means of the tongues $r$ and $r'$ formed on the inner faces of the respective members R and R', which operate in corresponding channels in the jaws T and T'.

The shaft 41 is adapted to be revolved by the handle 45.

Extending across and secured by the bolts 40 to the rear end of the bed-plate F, is the plate Z, and extending back and upward from the plate Z are the arms 1 and 2 which terminate in the respective bearings 3 and 4 for the shaft 5. Secured on the shaft 5 are the pulleys 6, 7 and 8, which are in vertical alinement with the respective pulleys N, O and S, and the two sets of pulleys are adapted to be connected by the belt 9, the latter being adapted to be shifted in order to attain various degrees of speed.

Secured on the shaft 5 is the bevel-gear 12, which meshes with the similar bevel-gear 13, which latter is secured on the rear end of the shaft 11, whereby the shaft 11 lies at right-angles to the shaft 5, but both lie on the same horizontal plane.

Formed integral with the bearing 4, and the arm 2, is the segmental arm 49, which carries a bearing 50 for the rear portion of shaft 11.

Numeral 19 denotes the cap or hood which forms, in fact the main portion of the sliding carriage, the lower edges of which are formed with beveled ribs 20, which slidably contact with the surfaces of the bed-plate F. Contacting with the beveled faces of the ribs 20 are the reversely beveled stationary ribs 21 which fit their respective lips G, as shown in Fig. 8, where they are secured each by a plurality of bolts 22, which bolts are adapted to be tightened or loosened by hand levers 40°, whereby the ribs 21 may be clamped tight against the ribs 20, in order to hold the cap or carriage 19 at any point desired to which it may be adjusted.

Extending across the rear end of the cap 19 is the bearing 10 for the shaft 11. Near the front end of the cap 19 is the bearing 18 for the shaft 16. Collars 46 and 47 are secured on the shaft 16 on each side of the bearing 18, to prevent longitudinal movement of the shaft 16 independently of the carriage.

The shafts 11 and 16 are spaced apart and they are in direct alinement with each other, and they are connected by the sleeve 14 whose ends approach each other in the center thereof. The shaft 11 is rigidly connected in the thimble 14 by the pin 15.

Formed in the periphery of the shaft 16 and in the interior of the sleeve 14 are corresponding channels in which is fitted the key 17 whereby the shaft 16 may slide endwise in the sleeve 14 but at all times carried revolubly therewith and with shaft 11.

Carried by the forward end of the cap 19 is the head 23, in which is located the miter gear 24, which is secured to the forward end of the shaft 16. Extending vertically and slidably through the head 23 is the shaft 25, around which is slidably mounted the miter gear 26, which meshes at right angles with the miter gear 24.

The shaft 25 is arranged to slide vertically through the head 23 and the gear 26, by means of the key 52, shown in Fig. 5.

Extending down from the head 23, and carried thereby, is the hanger 27 which provides a bearing for the stock 28, which is secured to the lower end of the shaft 25. The stock 28 is adapted to hold a tool, as for instance the tool 29. Said stock, tool, and the shaft 25 are adapted to be adjusted up and down by means of the gear stem 30, which is operative by the cross-bar 31, which parts are of ordinary construction, or they may be variously changed as desired.

A screw bearing 33 is secured in the face of the bed-plate F, passing through the plate 53, for supporting the screw-shaft 34. Said plate 53 is secured flat on the face of the bed-plate F, with its edges contacting with the edges of the ribs 20, in order to retain said ribs in place and in contact with the ribs 21.

The said shaft 34 extends through the head 23, but without threaded connection therewith, but they are adapted to travel forward and backward together, by reason of the collar 32 which is secured to said shaft and which contacts with the shoulder 48 which is integral with the head 23, as shown in Fig. 5.

Extending upward from one of the ribs 21, near and parallel with the cap 19, is the main scale 36, and coacting therewith is the pointer 37 which is carried by the cap 19, as shown in Fig. 8. By means of this scale and pointer it is evident that one can determine the distance, within the fraction of an inch, that the head 23, and therefore the tool 29, is moved forward or rearward. After obtaining this approximate adjustment I provide means for obtaining a still finer or infinitesimal adjustment by means of the auxiliary scale 38 formed around the hub of the wheel 35, in conjunction with the pointer 39 carried by the head 23, as shown in Fig. 2. It is of course to be understood that by turning the wheel 35 that the screw 34 turning in the bearing 33 will force the head forward or rearward, thereby changing the position of the tool to the position desired with reference to the point desired to be operated upon with relation to the work carried by the table previously referred to. It will now be seen that after the approximate adjustment has been obtained, and then after the accurate adjustment has been obtained as set forth, both by turning the wheel 35, then the head 23 may be locked in its adjusted position against inadvertent movements by simply tightening one or more of the bolts 22 by means of their hand-levers 400.

In practice the work to be operated upon may be placed upon the table, or in the aperture $a$ and then by turning the handle 45 the work will be accurately centered by the jaws and also it will be held in secure position. Then by turning the wheel 35 the tool 29 may be brought to the position desired with relation to and above the work. Now by turning the stem 30 the tool may be brought down into contact with the work.

It will now be seen that if the pulley K be turned by power, through a belt connected therewith, that the shaft 25 will be revolved through the action of the various parts as set forth, this of course will operate the tool and cause it to operate upon the work held by the table, thereby accomplishing the desideratum of this invention with absolute precision.

I desire that it be understood that various changes may be made in the several details of construction, and in the arrangement of the several parts, without departing from the spirit of my invention and without sacrificing any of the advantages thereof.

Having now fully shown and described my invention, what I claim and desire to secure by Letters Patent of the United States, is—

A mechanism of the nature set forth, comprising in combination, a standard, a work centering and holding table adjustably connected to the standard, a bed-plate located at the upper end of the standard, a horizontally movable carriage slidably mounted on the bed-plate and terminating at one end in a projecting head, a vertical shaft extending through said head, a horizontal shaft member revolubly carried by the carriage and movable therewith, miter-gears connecting said shafts, a second shaft member located in longitudinal alinement with the first shaft member but spaced therefrom, a sleeve surrounding the inner end portions of the first and second shaft members, means for securing said sleeve to the second shaft member, the second shaft member being supported by but not carried with the carriage, means for slidably mounting the first shaft member in said sleeve for endwise movement only, means for driving the second shaft member by power, a hood covering said shaft members and the sleeve and secured to said carriage, a hand operative screw for moving said carriage, a graduated scale for approximately locating the carriage, and a second scale for accurately locating the carriage after the approximate position has been attained, all substantially as shown and described.

In testimony I have hereunto subscribed my name to this specification in the presence of two subscribing witnesses.

ARTHUR LINDNER.

Witnesses:
GEO. W. GALVIN,
ELLA OGLE.